US006928057B2

(12) United States Patent
Bullman et al.

(10) Patent No.: US 6,928,057 B2
(45) Date of Patent: Aug. 9, 2005

(54) TRANSLATION SYSTEM AND RELATED METHOD FOR USE WITH A COMMUNICATION DEVICE

(75) Inventors: William R. Bullman, Bethlehem, PA (US); Matthew R. Henry, Fogelsville, PA (US); Ryan S. Holmqvist, Bethlehem, PA (US); Steven E. Strauss, Orefield, PA (US)

(73) Assignee: Agere Systems Inc., Allentown, PA (US)

( * ) Notice: Subject to any disclaimer, the term of this patent is extended or adjusted under 35 U.S.C. 154(b) by 778 days.

(21) Appl. No.: 09/777,054

(22) Filed: Feb. 5, 2001

(65) Prior Publication Data

US 2002/0001306 A1 Jan. 3, 2002

Related U.S. Application Data

(60) Provisional application No. 60/181,037, filed on Feb. 8, 2000.

(51) Int. Cl.[7] .............................................. G01R 31/08
(52) U.S. Cl. ....................................... 370/252; 370/474
(58) Field of Search ............................ 370/252, 351–3, 370/310, 338, 389, 395.1, 400–403, 445, 449, 463, 469, 470, 474

(56) References Cited

U.S. PATENT DOCUMENTS 5,963,551 A   10/1999   Minko 6,185,622 B1   2/2001   Sato
6,704,898 B1 * 3/2004   Furuskar et al. ............ 714/751

FOREIGN PATENT DOCUMENTS

EP   0 905 950 A1   7/2001
JP   10 290237 A   3/2000

OTHER PUBLICATIONS

Martin, James, Local Area Networks, 1994, Prentice Hall, Inc., PP: 13, 19–22, 100–108, 112–113, 204–206, 236, 214–216.*
"Connecting the Home With a Phone Line Network Chip Set" by Edward H. Frank and Jack Holloway: 2000 IEEE: pp. 1–12.
"Procedures for real–time Group 3 facsimile communication over IP networks"; ITU–T Recommendation T.38; Jun. 1998; pp. 1–30.

* cited by examiner

Primary Examiner—David Vincent

(57) ABSTRACT

A translation system and related method for use with a communications device having a physical layer system and a data link layer system with a media access control layer subsystem and coupleable to a communications network. In one embodiment, the translation system includes a generator that constructs a piggyback packet containing characteristics associated with the physical layer system. The translation system also includes a correlator, coupled to the generator, that receives the piggyback packet and extracts information about the physical layer system. The generator and correlator transmit and receive the piggyback packet without substantially modifying the media access control layer subsystem.

41 Claims, 4 Drawing Sheets

FIG. 4

| OCTET NUMBERS | 0-5 | 6-11 | 12-13 | 14 | 15 | 16 | 17-19 | 20-268 | 269-270 | 271-308 | 309-312 |
|---|---|---|---|---|---|---|---|---|---|---|---|
| FIELD | DA | SA | ETHERTYPE | SSTYPE | SSLENGTH | SSVERSION | VENDOR OUI | CONTROL DATA (VARIABLE 0-249 OCTETS) | NEXT ETHERTYPE | PAD (VARIABLE 0-38 OCTETS) | FCS |

TRANSLATION SYSTEM AND RELATED METHOD FOR USE WITH A COMMUNICATION DEVICE

CROSS-REFERENCE TO RELATED APPLICATION

The present application is a regular patent application based, and claiming priority, on a provisional patent application Ser. No. 60/181,037, filed on Feb. 8, 2000, entitled "Piggy Back Packets for Extra Information," commonly assigned with the present application and incorporated herein by reference.

TECHNICAL FIELD OF THE INVENTION

The present invention is directed, in general, to computer networks and, more specifically, to a translation system for use with a communications network, a related method and a communications device employing the same.

BACKGROUND OF THE INVENTION

In today's world of rapidly changing quality of service ("QoS") and network standards, it is difficult to use existing hardware or software without making extensive, and usually expensive, modifications to support new standards that may be introduced. Such network standards as Microsoft® defined Network Driver Interface Standard ("NDIS"), Open Systems Interconnection ("OSI"), Institute of Electrical and Electronic Engineers ("IEEE") Standard(s) 802.x, Integrated Services Digital Network ("ISDN"), and others that are known in the art, have proven to be no exception.

Currently, for instance, no standard way exists for a physical layer system of these network systems to be modified to pass necessary information associated with the physical layer (e.g., priority codes or encoding schemes associated with the physical layer system, interface characteristics, transmission line characteristics, and so on) up through various higher level hardware and software components of an OSI/IEEE system stack to still higher layers of the OSI/IEEE system stack. This physical information would be advantageous, as an example, for certain network protocols.

Other network protocol systems that are "rate adaptive" systems may employ QoS initiatives, such as those associated with the physical layer system. These QoS initiatives may include information concerning the interface characteristics of the physical layer system or the transmission characteristics associated with the physical layer system or data packet. The specification protocols associated with the rate adaptive systems call not only for the employment of an IEEE 802.3 Media Access Control ("MAC") layer subsystem architecture, but also calls for an associated physical layer system architecture employable to modulate and demodulate signals, for instance, on an "in-home" telephone line. In conjunction therewith, the physical layer system of the rate adaptive network system should accommodate the defined signaling and QoS initiatives.

Standardizing the passing of information, such as QoS signaling and other information, involves modifying, perhaps significantly, interposing layers of the system stack to allow the passing of the information from the physical layer system to, e.g., the data link layer system, the network layer system, or others. Modification of various layers of network protocol stacks, however, may in turn create further problems or concerns.

To illustrate an example of the above problems or concerns, for a particular application, substantial time and effort has been invested to optimize various layers or sublayers of their system protocol stacks. For instance, the drivers associated with a MAC layer subsystem of the data link layer system are often designed for a particular application. Modification of the MAC layer subsystem may adversely effect other network programs and applications. Therefore, it would be advantageous to be able to employ the current MAC layer subsystem driver despite variations in the physical layer system.

Accordingly, what is needed in the art is an improved system and method to pass information from the physical layer system for use with the higher layers in a protocol stack associated with a communications device.

SUMMARY OF THE INVENTION

To address the above-discussed deficiencies of the prior art, the present invention provides, a translation system and related method for use with a communications device having a physical layer system and a data link layer system with a Media Access Control ("MAC") layer subsystem and coupleable to a communications network. In one embodiment, the translation system includes a generator that constructs a "piggyback" packet containing characteristics associated with the physical layer system. The translation system also includes a correlator, coupled to the generator, that receives the piggyback packet and extracts information associated with the physical layer system. In a related embodiment, the correlator further receives the piggyback packet and extracts the information without substantially modifying the media access control layer subsystem. In yet another embodiment, the generator transmits the piggyback packet containing the information without substantially modifying the media access control layer subsystem.

The present invention introduces, in one aspect, a translation system that allows the physical and data link layer systems to communicate without substantially modifying the MAC layer subsystem. The piggyback packet is typically associated with, but not necessarily appended to, a data packet received by the physical layer system and contains characteristics associated with the physical layer system for judicious use by the data link layer system. The characteristics associated with the physical layer system include any information about the physical layer system itself (e.g., interface connectivity), transmission line characteristics of the communications network, and any communications device coupled thereto.

In one embodiment of the present invention, the piggyback packet is associated with a data packet received by the physical layer system. In another embodiment, the piggyback packet may be transmitted by the generator to the correlator without being associated with a data packet. Additionally, the correlator may pass the information about the physical layer system to a receiving subsystem embodied within the communications device.

The communications network, in one embodiment, may be a wireless communications network. Of course, however, other types of communications networks are within the broad scope of the present invention.

In one embodiment of the present invention, the characteristics associated with the physical layer system are interface characteristics of the physical layer system. In another embodiment, the characteristics associated with the physical layer system are transmission line characteristics of the communications network. Additionally, the generator may determine the characteristics associated with the physical layer system, store the characteristics in the piggyback packet, set a flag in the piggyback packet and pass the piggyback packet to the data link layer system.

In one embodiment of the present invention, the generator of the translation system is embodied in the physical layer system and the correlator of the translation system is embodied in the data link layer system. Additionally, at least a portion of the generator and the correlator may be embodied in a sequence of operating instructions operable on a processor of the communications device. Of course, the generator and correlator of the present invention may be associated with other subsystems of the communications device, or communications network, and may be embodied in software, dedicated or hardwired discrete or integrated circuitry, or combinations thereof.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 4 illustrates an exemplary block diagram of a piggyback packet constructed in accordance with the principles of the present invention.

DETAILED DESCRIPTION

Figure 1:
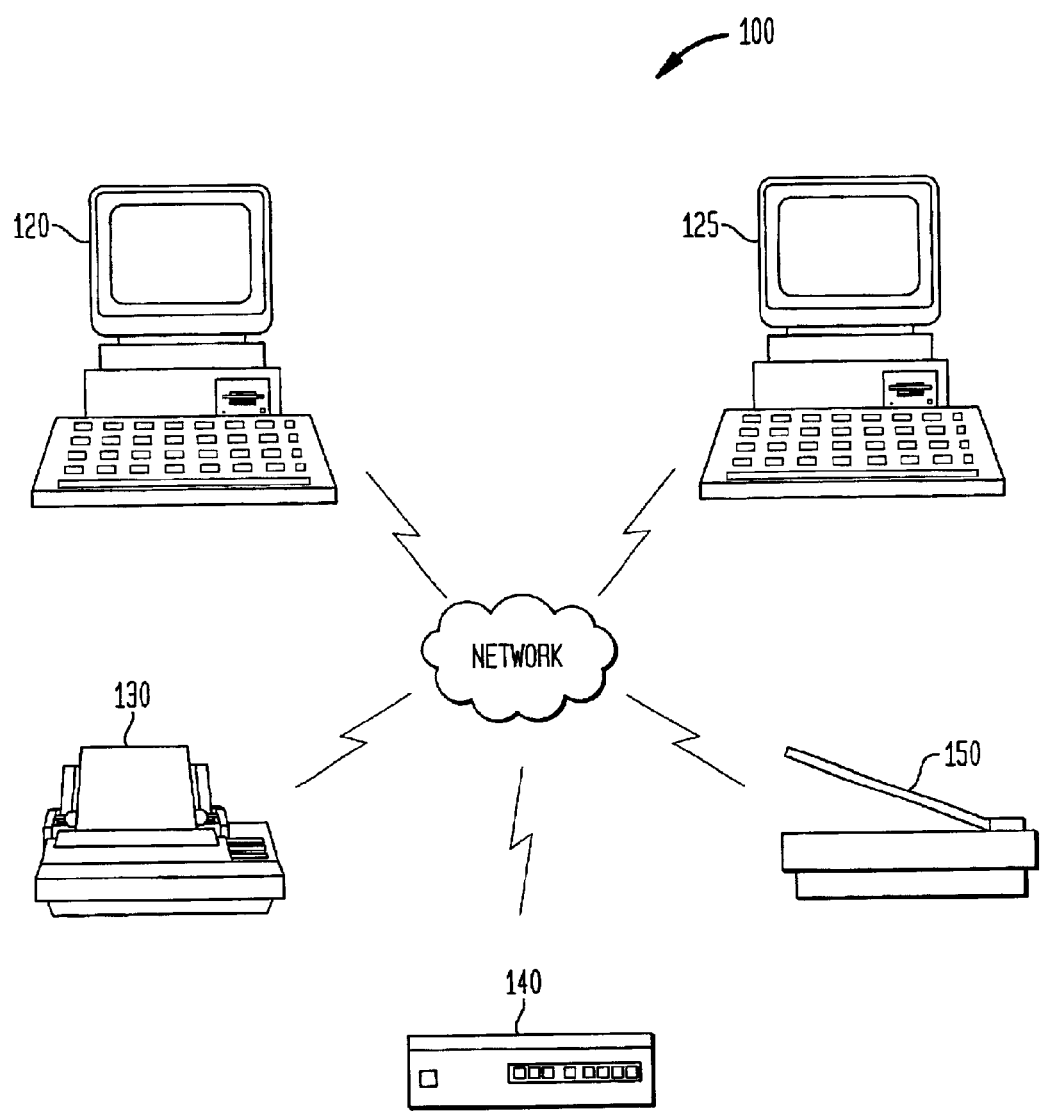
FIG. 1 illustrates a system level diagram of an embodiment of a communications network that may be employed in accordance with the principles of the present invention.

Referring initially to FIG. 1, illustrated is a system level diagram of an embodiment of a communications network 100 that may be employed in accordance with the principles of the present invention. More specifically, the communications network 100 is coupleable to a first communications device 120 and a second communications device 125. The first and second communications devices 120, 125 may communicate over the network 100. Also associated with the network 100 are a network printer 130, a bridge 140 and a network scanner 150. The network printer 130, the bridge 140 and the network scanner 150 are capable of communicating over a network using at least a portion of a network protocol stack.

In the exemplary embodiment shown, the network 100 may be an IEEE 802.3 system architecture for a "rate adaptive" network system such as a Home Phoneline Networking Architecture ("HPNA"). The HPNA is a standard created by the Home Phoneline Networking Alliance and employs the packet structure of IEEE 802.3 system architecture with additional protocols for rate adaptive HPNA transmission. Background information concerning HPNA is more fully discussed in Connecting the Home with a Phone Line Network Chip Set, by Edward H. Frank and Jack Holloway, IEEE Micro, March–April (2000) and incorporated herein by reference.

The first communications device 120 and the second communications device 125 may be personal computers or computer peripherals. However, the present invention is not limited to the communications devices 120, 125, 130, 140, 150, being a computer or computer peripherals, and may be any communications device that employs at least a portion of a protocol stack or stack-type system, such as routers, facsimile machines and wireless devices.

Also, note that the present invention may be used in other communications environments including a wireless system environment employing wireless system protocols, such as but not limited to IEEE Ethernet 802.11, a Bluetooth architecture, or other wireless protocols or environments presently known or later developed. The aforementioned and other standards described herein are incorporated herein by reference.

The first and second communications devices 120, 125 may also run (execute) certain application programs. For example, the application programs may include word processors, database applications, network programs and other applications associated with a HPNA network. The applications may also be designed to function in and through an interface such as a Microsoft®-defined Network Driver Interface Standard ("NDIS"), which includes a NDIS network architecture. In network systems, including a NDIS network architecture, the system topology is packet based. Those skilled in the art should understand, however, that other communications networks and architectures may be employed in accordance with the principles of the present invention.

Figure 2:
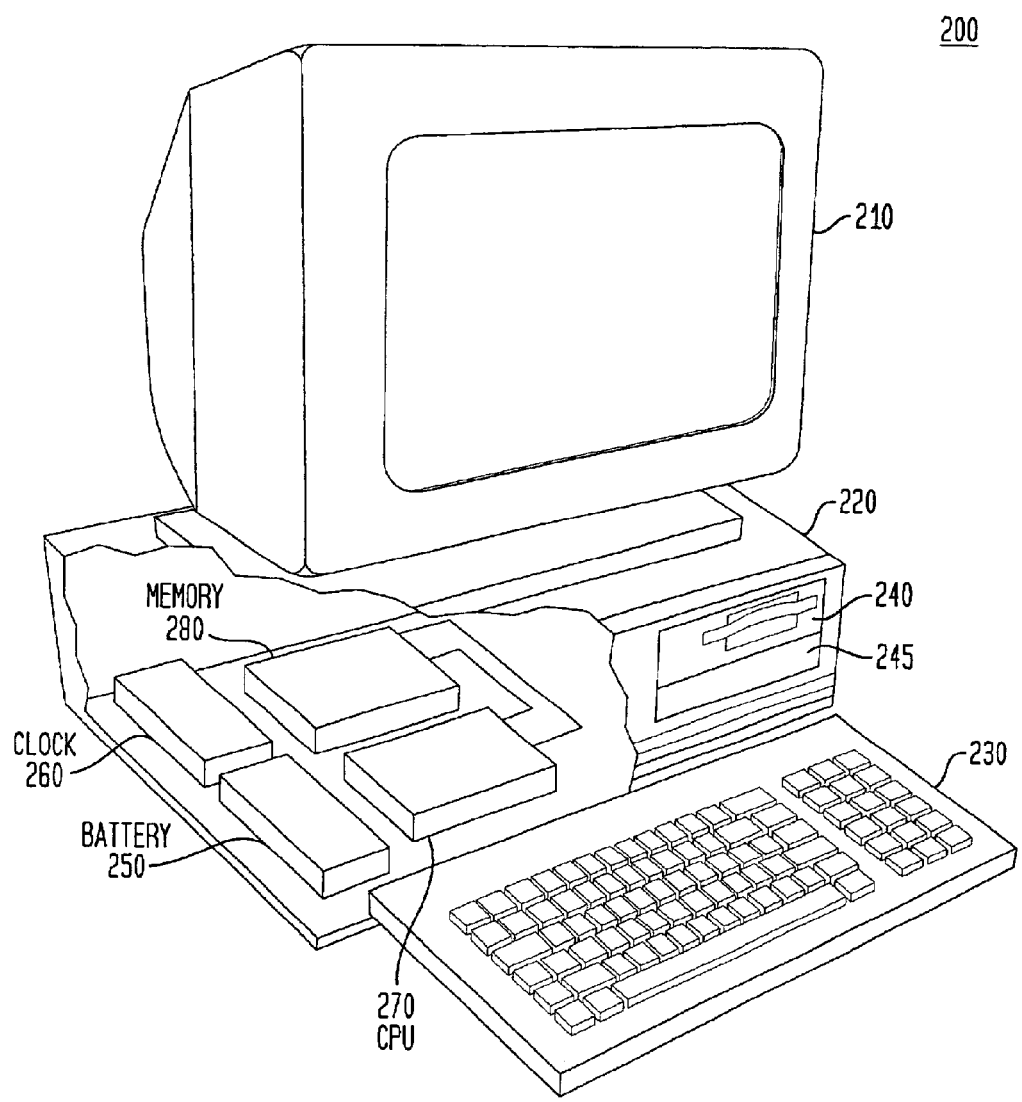
FIG. 2 illustrates an isometric view of an embodiment of a computer system operating as a communications device constructed according to the principles of the present invention.

Turning now to FIG. 2, illustrated is an isometric view of an embodiment of a computer system 200 operating as a communications device (e.g., the first or second communications devices 120, 125 of FIG. 1) constructed according to the principles of the present invention. The computer system 200 may be a conventional personal computer ("PC"), although other communication devices (e.g., a router, a bridge or a network printer) are well within the broad scope of the present invention.

The computer system 200 includes a monitor 210, a chassis 220 and a keyboard 230. Alternatively, the monitor 210 and the keyboard 230 may be replaced by other conventional output and input devices, respectively. The chassis 220 includes both a floppy disk drive 240 and a hard disk drive 245. The floppy disk drive 240 is employed to receive, read and write to external disks; the hard disk drive 245 is employed for fast access storage and retrieval. The floppy disk drive 240 may be replaced by or combined with other conventional structures to receive and transmit data and instructions, including without limitation, tape and compact disc drives, telephony systems and devices (including videophone, paging, networking and facsimile technologies), and serial and parallel ports.

The chassis 220 is illustrated having a cut-away portion that includes a battery 250, a clock 260, a central processing unit ("CPU") 270 and a memory storage device 280. The processing circuitry of the present invention may be embodied in the CPU 270 and the communications circuitry of the present invention may be embodied in the CPU 270 in combination with the memory storage device 280. Although the computer system 200 is illustrated having a single CPU 270, hard disk drive 245 and memory storage device 280, the computer system 200 may be equipped with a plurality of CPUs and peripheral devices.

It should be noted that any conventional computer system having at least one CPU and is capable of employing at least a portion of a protocol stack that is suitable to function as a communications device may be replaced, or be used in conjunction with, the computer system 200, including without limitation, videophones, telephones, routers, bridges, network printers, and hand-held devices, laptop/notebook, mini computers, including RISC and parallel processing architectures, or a combination thereof. Conventional computer system architecture is more fully discussed in Computer Organization and Architecture, by William Stallings, MacMillan Publishing Co. (3rd ed. 1993) and incorporated herein by reference. In other embodiments, the present invention may be embodied within software, hardware, firmware or a combination thereof.

Figure 3:
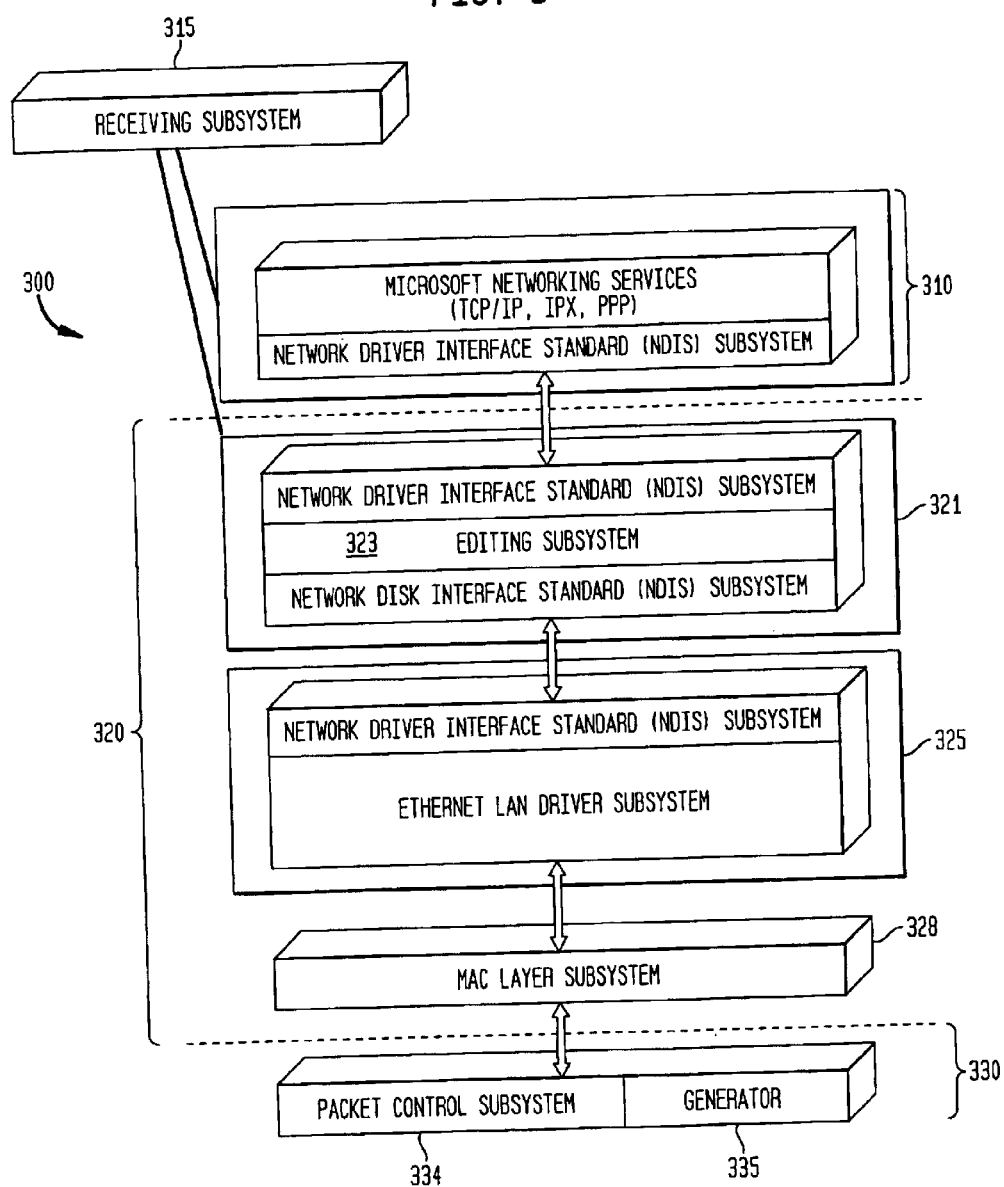
FIG. 3 illustrates a block diagram of an embodiment of a translation system constructed according to the principles of the present invention.

Turning now to FIG. 3, illustrated is a block diagram of an embodiment of a translation system 300 constructed according to the principles of the present invention. In the illustrated embodiment, the translation system 300 is employed in a communications network with a network protocol that is compatible with a HPNA. Of course, however, the present invention is not limited to HPNA and the translation system 300 may employ other network protocols.

A HPNA may be used to convey and receive data packets between the communications devices. In one embodiment of the present invention, a physical layer system 330 of the communications device may receive a data packet. The data packet may have embedded within it a payload data packet representing data that a communications device may wish to communicate to another communications device, as well as information associated with transmitting the data packet between communications devices (for example, an IEEE 802.3 standard data packet).

When the receiving communications device receives the data packet, a packet control subsystem 334 extracts the transmission specific data from the data packet, verifies the integrity of the data packet and transmits the data packet to a data link layer system 320. Associated with the packet control subsystem 334 is a generator 335. The generator 335 employs the data packet structure to construct a piggyback packet that contains characteristics associated with the physical layer system 330. Piggyback packets are discussed in more detail in the discussion of FIG. 4.

The generator 335, in one embodiment, may determine the characteristics associated with the physical layer system 330, store the characteristics in the piggyback packet, set a flag in the piggyback packet and pass the piggyback packet through a MAC layer subsystem 328 to the data link layer 320. The exemplary characteristics associated with the physical layer system 330 include parameters such as Quality of Service ("QoS") including signal to noise ratio, the modulation scheme employed by the communications network, packet priority, transmission and interface characteristics and so on. In an alternative embodiment, the generator 335 may measure or sample the characteristics associated with the physical layer system 330. In a related embodiment, the generator 335 may set a flag indicating that the generator 335 measured or sampled the characteristics. Of course, however, the generator 335 may set other flags or not set any flags in the piggyback packet depending upon the type of information to be passed using the piggyback packet.

Although it is within the scope of the present invention to use IEEE 802.3 packet structure to communicate information concerning the overall data packet from the data link layer system 320 or the physical layer system 330 through the MAC layer subsystem 328, it is not preferable to append the characteristics associated with the physical layer system 330 to the data packet. For instance, if the characteristics were appended to the data packet, the overall packet structure could violate the maximum packet size limitation of the protocol standard, rendering associated validity checks, such as Cyclical Redundancy Checks ("CRCs"), of the physical layer system 330 invalid.

Instead, to help overcome these limitations, a "piggyback" packet is created by the generator 335, associated with the physical layer system 330 of the communications device, and may be employed to transfer characteristics associated with the physical layer system 330. The generator 335 may transmit the piggyback packet immediately following the associated data packet. In another embodiment, the generator 335 may construct a piggyback packet independent of a data packet based upon changing characteristics of the physical layer system 330. Thus, the present invention may advantageously provide proactive notification of the characteristic changes.

In one advantageous embodiment, the passing of the piggyback packet within the translation system 300 can occur without necessitating a substantial modification of the MAC layer subsystem 328. The piggyback packet passes through the MAC layer subsystem 328 of the data link layer system 320 without substantial modification thereto, advantageously analogous to the transmission of a data packet. This may be advantageous in, among other things, that the user may have a high degree of confidence in the integrity of the MAC layer subsystem 328.

The piggyback packet is transmitted through the MAC layer subsystem 328 and a driver 325 to a correlator 321 of the data link layer system 320. The correlator 321 includes an editing subsystem 323 and performs piggyback packet recognition and extracts information about the physical layer system 330. In a related embodiment, the correlator 321 may pass the extracted information to a receiving subsystem 315 or to upper layers of the translation system's protocol stack. One skilled in the pertinent art is familiar with protocol stacks. Background information concerning networks and their associated protocols is discussed in Data Network Design, by Darren L. Spohn, McGraw-Hill (1993) and is incorporated herein by reference.

The receiving subsystem 315 may be embodied in a network layer system 310 or a software program that may communicate with the data link layer system 320 or the network layer system 310. In one embodiment, the receiving subsystem 315 may perform statistical analysis of the information, reporting functions or network management. In another embodiment, the receiving subsystem 315 may be embodied with a separate application program that is capable of running (executing) on the communications device.

In the illustrated embodiment, the generator 335 is embodied in the physical layer system 330 and the correlator 321 is embodied in the data link layer system 320. Additionally, at least a portion of the generator 335 and the correlator 321 may be embodied in a sequence of operating instructions operable on a processor of the communications device. Of course, the generator 335 and correlator 321 of the present invention may be associated with other subsystems of the communications device, or communications network, and may be embodied in software, hardware, firmware or a combination thereof.

Turning now to FIG. 4, illustrated is an exemplary block diagram of a piggyback packet constructed in accordance with the principles of the present invention. The piggyback packet advantageously allows characteristics associated with the physical layer system to be passed up to the data link layer system without substantially modifying the MAC layer system. As illustrated, the piggyback packet includes a portion of the IEEE 802.3 standard fields to allow the piggyback packet to pass through the MAC layer system and other layers of the protocol stack. For example, the standard fields include a Destination Address (DA), a Source Address (SA), an Ethertype, a Pad field and a Frame Check Sequence (FCS). Table 4.1 describes the contents of the piggyback packet of FIG. 4.

TABLE 4.1

| Field | Length | Field Description |
| --- | --- | --- |
| DA | 6 octets | Destination Address |
| SA | 6 octets | Source Address |
| Ethertype | 2 octets | 0x886c (HPNA Link Control Frame) |
| SSType | 1 octet | 0x05 |
| SSLength | 1 octet | Number of additional octets in the control header, starting with the SSVersion field and ending with the second(last) octet of the Next Ethertype field. |
| SSVersion | 1 octet | 0x00 |
| Vendor OUI | 3 octets | An IEEE assigned Organizationally Unique Identifier |
| Control data | 0–249 octets | Vendor specific control data |
| Next Ethertype | 2 octets | 0x0000 |
| Pad | 0–38 octets | Any value octet |
| FCS | 4 octets | |

As illustrated in FIG. 4 and Table 4.1, the present invention advantageously provides additional information, such as the characteristics associated with the physical layer system in the control data field of the piggyback packet. For instance, the control data field may contain a sequence of Octets that delineate the modulation technique employed by the physical layer system.

In one embodiment of the present invention, the piggyback packet may take the form of a receive packet information type or a receive asynchronous information type. The receive packet information type is generally constructed in accordance with the reception of a data packet. Table 4.2 describes the contents of the piggyback packet of the receive packet information type.

TABLE 4.2

| Field | Length | Field Description |
| --- | --- | --- |
| DA | 6 octets | Destination Address (see AG_Opt) |
| SA | 6 octets | Source Address of the previously received data packet |
| Ethertype | 2 octets | 0x886c (HPNA Link Control Frame) |
| SSType | 1 octet | 0x05 |
| SSLength | 1 octet | Number of additional octets in the control header, starting with the SSVersion field and ending with the second(last) octet of the Next Ethertype field. |
| SSVersion | 1 octet | Version Info |
| Vendor OUI | 3 octets | Vendor X OUI, e.g. 0x00601d (MSB to LSB) |
| AG_TYPE | 1 octet | 0x00 = RcvPktInfo |

TABLE 4.2-continued

| Field | Length | Field Description |
| --- | --- | --- |
| AG_Ver | 1 octet | 0x00 |
| AG_Opt | 1 octet | [0]=0; AG_Mod_Type contain valid data and the destination address = broadcast. This is used when the receipt of a packet causes AG_Mod_Type to change from its previously reported value. [0]=1; AG_Mod_Type does NOT contain valid data and the destination address must be the destination address of the previous data packet. This is used when the receipt of a packet does not cause AG_Mod_Type to change its previously reported value. |
| AG_Pad | 1 octet | Reserved (for alignment) |
| AG_MSE | 4 octets | MSE (MSB to LSB) |
| AG_PE | 1 octet | Payload Encoding of the Bit Stream |
| AG_Priority | 1 octet | Phy Priority Class per packet |
| AG_Mod_Type | 1 octet | Signal Modulation Type |
| Next Ethertype | 2 octets | 0x0000 |
| Pad | 0–38 octets | Any value octet |
| FCS | 4 octets | |

As illustrated in FIG. 4 and Table 4.2, the present invention advantageously provides additional information, such as the characteristics associated with the physical layer system in the packet type (AG_TYPE), the modulation type (AG_Mod_Type), the priority type (AG_Priority) and the mean squared error value (AG_MSE). The packet type indicates the type of piggyback packet. The modulation type indicates the modulation technique employed by the physical layer system, including a pulse code modulation, a pulse amplitude modulation, a delta modulation and a differential pulse code modulation. Of course, however, the present invention is not limited to the above modulation techniques.

The priority type specifies the priority status of the associated data packet. In another embodiment of the present invention, the priority type indicates that the piggyback packet is to be passed up the protocol stack. The mean squared error value indicates a mean squared error of a signal or a group of signals. Of course, however, other fields of the piggyback packet or additional fields may be used to relate other type of information.

In another embodiment of the present invention, the piggyback packet may take the form of a receive asynchronous information type. The receive asynchronous information type is generally constructed when the characteristics associated with the physical layer system change. Table 4.3 describes the contents of the piggyback packet of the receive asynchronous information type.

TABLE 4.3

| Field | Length | Field Description |
| --- | --- | --- |
| DA | 6 octets | Destination Address (see AG_Opt) |
| SA | 6 octets | Source Address of the previously received data packet |
| Ethertype | 2 octets | 0x886c (HPNA Link Control Frame) |
| SSType | 1 octet | 0x05 |
| SSLength | 1 octet | Number of additional octets in the control header, starting with the SSVersion field and ending with the second(last) octet of the Next Ethertype field. |
| SSVersion | 1 octet | Version Info |
| Vendor OUI | 3 octets | Vendor X OUI, e.g. 0x00601d (MSB to LSB) |
| AG_TYPE | 1 octet | 0x00 = RcvAsyncInfo |

TABLE 4.3-continued

| Field | Length | Field Description |
|---|---|---|
| AG_Ver | 1 octet | 0x00 |
| AG_Pad | 8 octets | Reserved to maintain the same AG_Mod_Type alignment as RcvPktInfo |
| AG_Mod_Type | 1 octet | Signal Modulation Type |
| Next Ethertype | 2 octets | 0x0000 |
| Pad | 0–38 octets | Any value octet |
| FCS | 4 octets | |

As illustrated in FIG. 4 and Table 4.3, the present invention advantageously provides additional information, such as the characteristics associated with the physical layer system in the packet type (AG_TYPE) and the modulation type (AG_Mod_Type). As described above, the packet type indicates the type of piggyback packet. The modulation type indicates the modulation technique employed by the physical layer system, including a pulse code modulation, a pulse amplitude modulation, a delta modulation and a differential pulse code modulation. In other embodiments, the present invention is not limited to the modulation techniques described above and may use different or additional modulation techniques. Of course, however, other fields of the piggyback packet or additional fields may be used to relate other type of information.

Those skilled in the art understand that the previously described embodiment of the packet transport system is submitted for illustrative purposes only and other embodiments are well within the broad scope of the present invention. Although the present invention has been described in detail, those skilled in the art should understand that they can make various changes, substitutions and alterations herein without departing from the spirit and scope of the invention in its broadest form.

What is claimed is:

1. For use with a communications device having a physical layer system and a data link layer system with a media access control layer subsystem and coupleable to a communications network, a translation system, comprising:
   a generator configured to construct a piggyback packet that reflects a changed characteristic of said physical layer system; and
   a correlator, associated with said generator, configured to receive said piggyback packet and extract information about said physical layer system.

2. The translation system as recited in claim 1 wherein said correlator further receives said piggyback packet and extracts said information without substantially modifying said media access control layer subsystem.

3. The translation system as recited in claim 1 wherein said generator further constructs and transmits said piggyback packet without substantially modifying said media access control layer subsystem.

4. The translation system as recited in claim 1 wherein said piggyback packet is associated with a data packet received by said physical layer system.

5. The translation system as recited in claim 1 wherein said communications network is a wireless communications network.

6. The translation system as recited in claim 1 wherein said characteristics associated with said physical layer system are interface characteristics of said physical layer system.

7. The translation system as recited in claim 1 wherein said characteristics associated with said physical layer system are transmission line characteristics of said communications network.

8. The translation system as recited in claim 1 wherein said generator further determines said characteristics associated with said physical layer system, stores said characteristics in said piggyback packet, sets a flag in said piggyback packet and passes said piggyback packet to said data link layer system.

9. The translation system as recited in claim 1 wherein said generator is embodied in said physical layer system and said correlator is embodied in said data link layer system.

10. The translation system as recited in claim 1 wherein said correlator further passes said information about said physical layer system to a receiving subsystem embodied within said communications device.

11. The translation system as recited in claim 1 wherein said generator constructs said piggyback packet based upon changing characteristics of said physical layer system and independent of said data packet.

12. The translation system as recited in claim 1 wherein at least a portion of said generator and said correlator are embodied in a sequence of operating instructions operable on a processor of said communications device.

13. A method for use with a communications device having a physical layer system and a data link layer system with a media access control layer subsystem and coupleable to a communications network, comprising:
   constructing a piggyback packet that reflects a changed characteristic of said physical layer system; and
   receiving said piggyback packet and extracting information about said physical layer system.

14. The method as recited in claim 13 wherein said receiving and said extracting are performed without substantially modifying said media access control layer subsystem.

15. The method as recited in claim 13 wherein said constructing is performed without substantially modifying said media access control layer subsystem.

16. The method as recited in claim 13 wherein said piggyback packet is associated with a data packet received by said physical layer system.

17. The method as recited in claim 13 wherein said communications network is a wireless communications network.

18. The method as recited in claim 13 wherein said characteristics associated with said physical layer system are interface characteristics of said physical layer system.

19. The method as recited in claim 13 wherein said characteristics associated with said physical layer system are transmission line characteristics of said communications network.

20. The method as recited in claim 13 wherein said constructing further comprises determining said characteristics associated with said physical layer system, storing said characteristics in said piggyback packet, setting a flag in said piggyback packet and passing said piggyback packet to said data link layer system.

21. The method as recited in claim 13 wherein said constructing is performed by said physical layer system and said receiving is performed by said data link layer system.

22. The method as recited in claim 13 wherein said receiving and said extracting information further comprises passing said information about said physical layer system to a receiving subsystem embodied within said communications device.

23. The method as recited in claim 13 wherein said constructing is based upon changing characteristics of said physical layer system and independent of said data packet.

24. The method as recited in claim 13 wherein said method is at least partially embodied in a sequence of operating instructions operable on a processor of said communications device.

25. A communications device coupleable to a communications network, comprising:
- a physical layer system coupled to said communications network;
- a data link layer system coupled to said physical layer system and having a media access control layer subsystem; and
- a translator, including:
    - a generator that constructs a piggyback packet that reflects a changed characteristic of said physical layer system, and
    - a correlator, associated with said generator, that receives said piggyback packet and extracts information about said physical layer system for use by said data link layer system.

26. The communications device as recited in claim 25 wherein said correlator further receives said piggyback packet and extracts said information without substantially modifying said media access control layer subsystem.

27. The communications device as recited in claim 25 wherein said generator further constructs and transmits said piggyback packet without substantially modifying said media access control layer subsystem.

28. The communications device as recited in claim 25 wherein said piggyback packet is associated with a data packet received by said physical layer system.

29. The communications device as recited in claim 25 wherein said communications network is a wireless communications network.

30. The communications device as recited in claim 25 wherein said characteristics associated with said physical layer system are interface characteristics of said physical layer system.

31. The communications device as recited in claim 25 wherein said characteristics associated with said physical layer system are transmission line characteristics of said communications network.

32. The communications device as recited in claim 25 wherein said generator further determines said characteristics associated with said physical layer system, stores said characteristics in said piggyback packet, sets a flag in said piggyback packet and passes said piggyback packet to said data link layer system.

33. The communications device as recited in claim 25 wherein said generator is embodied in said physical layer system and said correlator is embodied in said data link layer system.

34. The translation system as recited in claim 25 wherein said correlator further passes said information about said physical layer system to a receiving subsystem embodied within said communications device.

35. The communications device as recited in claim 25 wherein said generator constructs said piggyback packet based upon changing characteristics of said physical layer and independent of said data packet.

36. The communications device as recited in claim 25 wherein at least a portion of said generator and said correlator are embodied in a sequence of operating instructions operable on a processor of said communications device.

37. A piggyback packet for use with a communications communication network employing various types of packets, said communications network having a physical layer system and a data link layer system associated with a protocol stack, comprising:
- a packet type that indicates if said piggyback packet is independent of a data packet; and
- a modulation type that indicates a type of modulation signal used in said physical layer system.

38. The piggyback packet as recited in claim 37 wherein said packet type is selected from the group consisting of:
- a receive packet information type, and
- a receive asynchronous information type.

39. The piggyback packet as recited in claim 38 wherein said piggyback packet further comprises a priority type and a mean squared error value when said packet type is said receive packet information type, said priority type indicates a priority of said piggyback packet and said mean squared error value indicates a mean squared error of a signal or group of signals.

40. The piggyback packet as recited in claim 39 wherein said priority flag further indicates that said piggyback packet is to be passed up said protocol stack.

41. The piggyback packet as recited in claim 39 wherein said modulation type is selected from the group consisting of:
- a pulse code modulation,
- a pulse amplitude modulation,
- a delta modulation, and
- a differential pulse code modulation.

* * * * *